(12) United States Patent
Hlushkou et al.

(10) Patent No.: US 12,605,010 B2
(45) Date of Patent: Apr. 21, 2026

(54) POT BODY, AIR FRYER, AND AIR CIRCULATION SYSTEM

(71) Applicant: STENT(GUANGZHOU) INDUSTRIAL CO., LTD., Guangzhou (CN)

(72) Inventors: Ilya Hlushkou, Guangzhou (CN); Mei Zhang, Guangzhou (CN); Qian Zhang, Guangzhou (CN); Xiaofeng Zheng, Guangzhou (CN)

(73) Assignee: STENT(GUANGZHOU) INDUSTRIAL CO., LTD., Guangzhou (CN)

( * ) Notice: Subject to any disclaimer, the term of this patent is extended or adjusted under 35 U.S.C. 154(b) by 874 days.

(21) Appl. No.: 17/957,023

(22) Filed: Sep. 30, 2022

(65) Prior Publication Data

US 2024/0041253 A1 Feb. 8, 2024

(30) Foreign Application Priority Data

| Aug. 5, 2022 | (CN) | .......................... 202210936492.X |
| Aug. 5, 2022 | (CN) | .......................... 202222053303.2 |
| Aug. 5, 2022 | (CN) | .......................... 202222070884.0 |

(51) Int. Cl.
*A47J 37/06* (2006.01)

(52) U.S. Cl.
CPC .................................. *A47J 37/0641* (2013.01)

(58) Field of Classification Search
CPC ........ A47J 37/0641; A47J 27/00; A47J 27/08;
A47J 27/09; A47J 27/092; A47J 36/025;
A47J 36/06; A47J 36/08; A47J 36/10;
A47J 36/12; A47J 36/18; A47J 36/20;
A47J 36/22; A47J 37/00; A47J 37/12;
A47J 37/1204; A47J 37/1209; A47J
37/1214; A47J 537/1219; A47J 537/1266;
A47J 37/128; A47J 37/129; A47J
37/1295; A47J 37/047; A47J 37/0664
USPC ......... 99/324, 325, 330, 343, 369, 391, 400,
99/418, 422, 425, 426, 430, 440, 444,
99/447, 448, 449, 451, 483, 495, 501
See application file for complete search history.

(56) References Cited

U.S. PATENT DOCUMENTS 11,045,046 B1 * 6/2021 Man .................... A47J 37/0641

FOREIGN PATENT DOCUMENTS

| CN | 110840285 A | 2/2020 |
| CN | 113133684 A | 7/2021 |

(Continued)

*Primary Examiner* — Phuong T Nguyen
(74) *Attorney, Agent, or Firm* — HOWARD M COHN and Associates, LLC

(57) ABSTRACT

The present disclosure belongs to the field of cooking utensils, and in particular relates to a pot body, an air fryer, and an air circulation system. The air fryer includes a machine body and a pot body. The pot body is of rectangular structure. A flow guide isolation hood and a lower fan blade are arranged in the machine body. A point of intersection between a rotation axis of the lower fan blade and the flow guide isolation hood is B. Any point on an edge of the flow guide isolation hood is taken as A. An angle between a tangential direction of the point A and a horizontal plane is defined as α, 45°≤α≤90°. The air fryer may accommodate most of food to ensure the integrity of food; and air forms a vortex rotating at a high speed, solving the problem of non-uniform heat.

12 Claims, 7 Drawing Sheets

(56)            References Cited

FOREIGN PATENT DOCUMENTS

| | | | |
|---|---|---|---|
| CN | 113749528 | A | 12/2021 |
| CN | 114190784 | A | 3/2022 |
| WO | 2022062790 | A1 | 3/2022 |

* cited by examiner

POT BODY, AIR FRYER, AND AIR CIRCULATION SYSTEM

RELATED APPLICATIONS

The present disclosure is provided based on three Chinese patent applications: No. 202222070884.0, No. 202222053303.2, and No. 202210936492.X, filed on Aug. 5, 2022, and claims the priorities of these three Chinese patent applications, the entire content of which is incorporated by reference herein.

TECHNICAL FIELD

The present disclosure belongs to the technical field of cooking utensils, in particular to a pot body, an air fryer, and an air circulation system.

BACKGROUND

An air fryer is a household appliance for cooking food with a high-speed air circulation technology. Air is quickly heated by a baking device to generate high-temperature air, and then the high-temperature air is blown into a pot by using a fan to heat the food, such that hot air is circulated in a closed space to form a rapid circulating heat flow inside the food baking pot. The food is fried with its oil, such that the food is dehydrated, the surface becomes golden yellow and crisp, and the frying effect is achieved. It is gaining popularity due to healthier and more convenient cooking with less or no oil.

In order to achieve high-speed circulation of air, a relatively simple method is to give the air a certain angular velocity by means of a fan to form an air vertex in a circular or quasi-circular space under the action of a circular or quasi-circular wall surface. Most of existing air fryers on the market use such principle, which requires that the air fryers must be designed to be circular or quasi-circular. This limitation makes it difficult to adapt to the kitchen environment and the shape and size of food in many cases. For example, a whole fish, a kebab, side-by-side bread, etc. are not easy to place in a circular baking pot, and food often has to be cut open or a baking pot has a large size, which takes up a lot of space and is inconvenient for the placement in a kitchen, thereby affecting the interaction between the kitchen environment and people on the whole, and bringing the inconvenience to use.

SUMMARY

In order to solve the problems in the above background, the present disclosure provides a pot body, an air fryer, and an air circulation system. The air fryer is more space-saving and more convenient for placing food by designing an accommodating cavity to be rectangular in combination with the requirements of a kitchen environment, a food size, etc. Comprehensive use shows that the rectangular pot body in the present disclosure saves space by more than 40% compared with a circular pot body. Moreover, through the structural optimization design of the flow guide isolation hood, hot air in a heating cavity circulates to form an air vortex, such that high-speed circulation of the air is realized, energy in the heating cavity can be evenly spread, and water in the food can be smoothly taken away to achieve the better cooking effect.

A first objective of the present disclosure is to provide a pot body, including a pot bottom and side walls surrounding the pot bottom, where the pot bottom and the side walls form an accommodating cavity, the accommodating cavity is of a rectangular structure, a length a of the accommodating cavity is less than or equal to 80 cm, a width b of the accommodating cavity is more than or equal to 10 cm, and a ratio k of the length a to the width b of the accommodating cavity is equal to 1.5-5.

Preferably, k=2-2.5.

Preferably, the width b of the accommodating cavity is 10-50 cm.

A second objective of the present disclosure is to provide an air fryer, including the above pot body, and further including a machine body and a flow guide isolation hood arranged in the machine body, where the flow guide isolation hood seals an opening in an upper end of the pot body to form a heating cavity after the pot body is put into the machine body; and an air inlet is formed in the middle of the flow guide isolation hood, a lower fan blade is arranged below the air inlet, a flow guide curved surface is formed on an inner side surface of the flow guide isolation hood in a manner of surrounding the air inlet, and the flow guide curved surface guides hot air in the heating cavity to the periphery of the heating cavity from the air inlet.

Further, a point of intersection between a rotation axis of the lower fan blade and a top surface of the flow guide isolation hood is B, any point on an edge of the inner side surface of the flow guide isolation hood is taken as A, AB is a line segment on the flow guide curved surface, an angle between a tangential direction of the point A on the line segment AB and a horizontal plane is defined as a derived angle α, and 45°≤α≤90°.

Further, the line segment AB on the flow guide curved surface is a curve or a polyline.

Further, when the model and size of the lower fan blade are fixed, a distance h between a plane where a highest point of the lower fan blade is located and the top of the inner side surface of the flow guide isolation hood is more than 0 and less than 30.

Preferably, 0<h<10.

Further, the inner side surface of the flow guide isolation hood includes a horizontal plane area positioned in the middle and the flow guide curved surface positioned at the periphery of the horizontal plane area, the flow guide curved surface gradually tilts down from inside to outside, the air inlet is formed in the horizontal plane area, and a rotational area of the lower fan blade is adapted to the horizontal plane area.

Further, the flow guide isolation hood has an integral structure and is of an inverted bowl-like structure, and the flow guide curved surface is positioned on the inner side surface of the flow guide isolation hood and gradually tilts down from inside to outside.

Further, the flow guide isolation hood has a split structure and includes an isolation hood for sealing the opening in the upper end of the pot body and a guide plate positioned below the isolation hood, the guide plate is of the inverted bowl-like structure, the lower fan blade is positioned below the guide plate, the flow guide curved surface is positioned on an inner side surface of the guide plate, and the flow guide curved surface gradually tilts down from inside to outside.

Further, the air fryer further includes a first heat dissipation cavity and a second heat dissipation cavity formed in the machine body and communicating with each other, the first heat dissipation cavity is positioned above the heating cavity, the second heat dissipation cavity is positioned below the heating cavity, a heating tube is arranged in the heating cavity, the heating cavity communicates with the first heat dissipation cavity via the air inlet, and heat dissipation holes are formed in the bottom of the second heat dissipation cavity.

Further, a motor is arranged above the first heat dissipation cavity, a rotating shaft of the motor penetrates through the first heat dissipation cavity and passes through the flow guide isolation hood via the air inlet, an upper fan blade and the lower fan blade are coaxially installed on the rotating shaft, the upper fan blade is positioned in the first heat dissipation cavity, and the lower fan blade is positioned in the heating cavity.

Further, a cold air inlet is formed in an upper portion of the first heat dissipation cavity, the first heat dissipation cavity and the second heat dissipation cavity communicate with each other to form a cold air circulation cavity, the heating cavity forms a hot air circulation cavity, and the cold air circulation cavity wraps the hot air circulation cavity.

A third objective of the present disclosure is to provide an air circulation system for the air fryer, including hot air circulation and cold air circulation, where hot air generated by the lower fan blade flows to the periphery of the heating cavity via the flow guide curved surface while a low-pressure area is formed under the lower fan blade, the air dispersed to the periphery of the heating cavity is gathered from the bottom to the middle, the air spirally rises in the low-pressure area in the middle, and after rising to the lower fan blade, the air is thrown around to form the hot air circulation; and the upper fan blade rotates to blow cold air entering the first heat dissipation cavity to the periphery, and the cold air flows to the second heat dissipation cavity to form the cold air circulation wrapping the heating cavity.

Compared with the prior art, the present disclosure has the following beneficial effects:

(1) According to the present disclosure, the pot body is designed to be of the rectangular structure, such that the air fryer is more suitable for the size and environment of a kitchen; the length-width ratio k of the accommodating cavity is designed to be 1.5-5, such that most of food may be accommodated and normal demands of users are met; and compared with the circular pot body in the prior art, the rectangular pot body saves more space in the kitchen and may adapt to the sizes of various food to ensure the integrity of the food.

(2) According to the present disclosure, as 45°≤α≤90° and 0<h<30, the shape of the flow guide isolation hood and the position of the lower fan blade in the flow guide isolation hood are limited; and the above limitation is conducive to reducing the air circulation resistance, thereby making the hot air circulation in the heating cavity more uniform, and achieving the better cooking effect.

(3) According to the present disclosure, the cold air circulation cavity is formed by the first heat dissipation cavity and the second heat dissipation cavity communicating with each other, and the cold air circulation cavity wraps the heating cavity to dissipate heat and greatly reduce the temperature rise of the surfaces of the components and the machine body inside the air fryer at the same time.

(4) The hot air generated by the lower fan blade during operation of the present disclosure flows to the periphery of the hot air circulation cavity via the flow guide curved surface, especially flows to two ends of the pot body in a length direction while the low-pressure area is formed under the lower fan blade, the air dispersed to the periphery of the hot air circulation cavity is gathered from the bottom to the middle, the air spirally rises in the low-pressure area in the middle, and after rising to the lower fan blade, the air is thrown around to form high-speed circulation of the hot air; and heat generated by the heating tube can be uniformly dispersed into the whole pot body under the action of this air circulation, and water generated by the food is discharged out from an air outlet, such that the high-speed circulation of the air in the heating cavity is finally realized and the better cooking effects of uniform cooking, tenderness for inside, and crispiness for outside are achieved.

BRIEF DESCRIPTION OF DRAWINGS

In order to more clearly illustrate the technical solution in the embodiments of the present disclosure or the prior art, the accompanying drawings that need to be used in the embodiments or the prior art will be briefly introduced below. Apparently, the accompanying drawings described below are merely some embodiments of the present disclosure. Those of ordinary skill in the art may also derive other accompanying drawings from these accompanying drawings without creative efforts.

In which: 1: pot body; 11: first side wall; 12: second side wall; 13: third side wall; 14: fourth side wall; 15: handle; 2: machine body; 21: heating tube; 3: flow guide isolation hood; 31: air inlet; 32: air outlet; 33: flow guide curved surface; 34: flow guide cut-in area; 36: horizontal plane area; 37: isolation hood; 38: flow guide plate; 4: heating cavity; 5: lower fan blade; 6: first heat dissipation cavity; 7: second heat dissipation cavity; 8: motor; 9: rotating shaft; and 10: upper fan blade.

DETAILED DESCRIPTION OF EMBODIMENTS

The technical solution in the embodiments of the present disclosure will be clearly and completely described below with reference to the accompanying drawings in the present disclosure. Apparently, the described embodiments are merely a part rather than all of the embodiments of the present disclosure. All other embodiments obtained by those of ordinary skill in the art based on the embodiments in the present disclosure without creative efforts fall within the scope of protection of the present disclosure.

The present disclosure will be described in detail below in conjunction with FIGS. 1 to 14 and specific embodiments.

Figure 1:
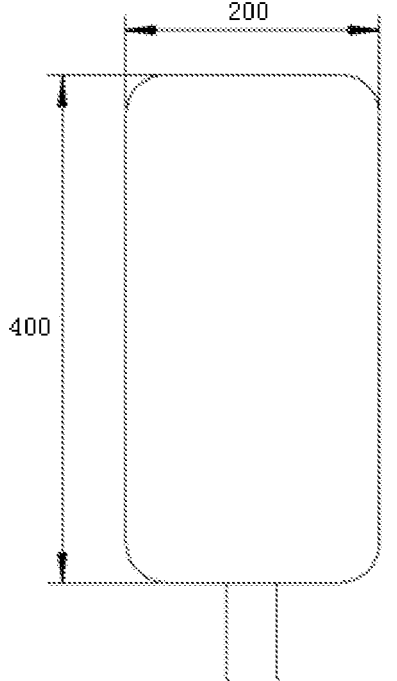
FIG. 1 is a schematic top view of a circular pot body in the prior art and a pot body in the present disclosure.
Figure 1:
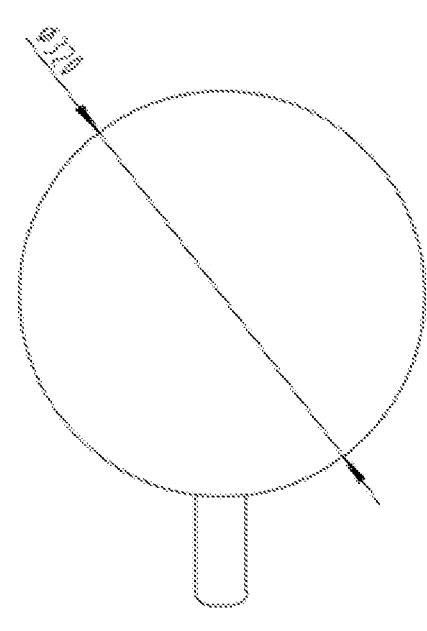
Figure 2:
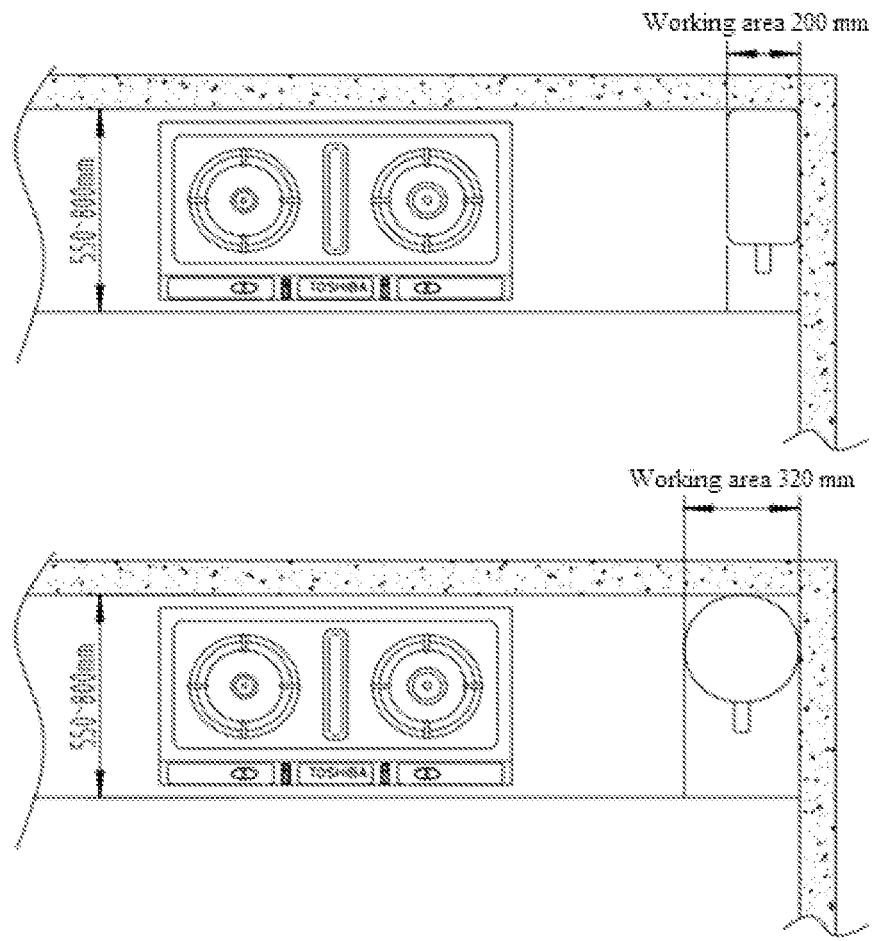
FIG. 2 is a schematic diagram of placing the circular pot body in the prior art and the pot body in the present disclosure at a corner of a kitchen.

As shown in FIG. 1 that is a schematic diagram of comparison between a pot body with a circular structure in the prior art and a pot body with a rectangular structure in the present disclosure, it is assumed that a size of the rectangular pot body in the present disclosure is 400*200 mm and a size φ of the circular pot body in the prior art is equal to 320 mm, and if the rectangular pot body and the circular pot body have the same height, they have the same capacity by calculation. FIG. 2 shows the positions of the circular pot body in the prior art and the rectangular pot body in the present disclosure placed at a corner of a kitchen. When a pot body access space of an air fryer is defined as a working area, a width of the working area of the pot body in the present disclosure is 200 mm, and a width of the working area of the circular pot body in the prior art is 320 mm. It may be seen from this that the pot body with the same capacity in the present disclosure may save space by more than 40%.

Figure 3:
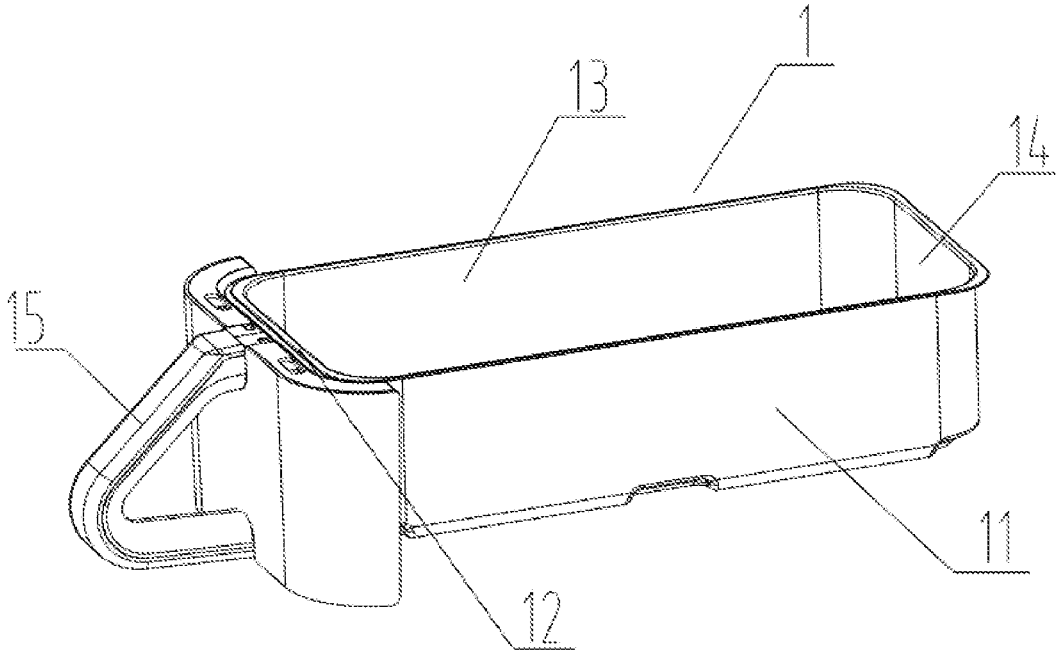
FIG. 3 is a three-dimensional diagram of the pot body in the present disclosure.
Figure 4:
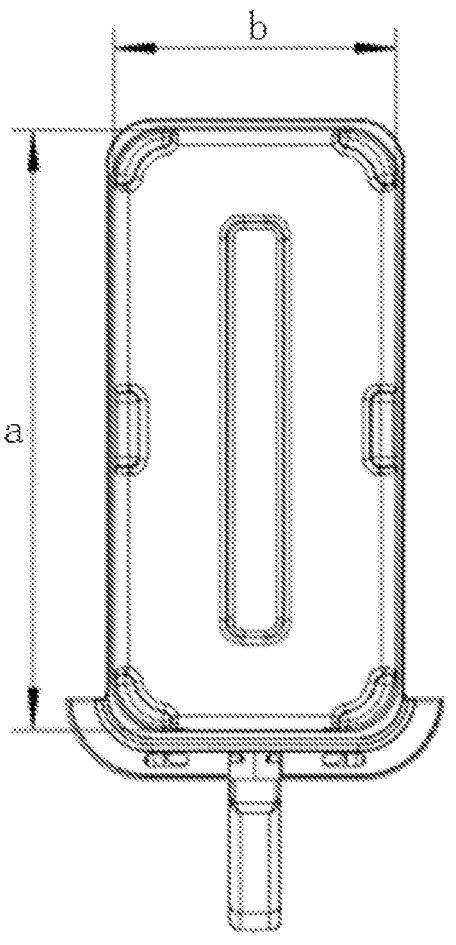
FIG. 4 is a top view of the pot body in the present disclosure.
Figure 5:
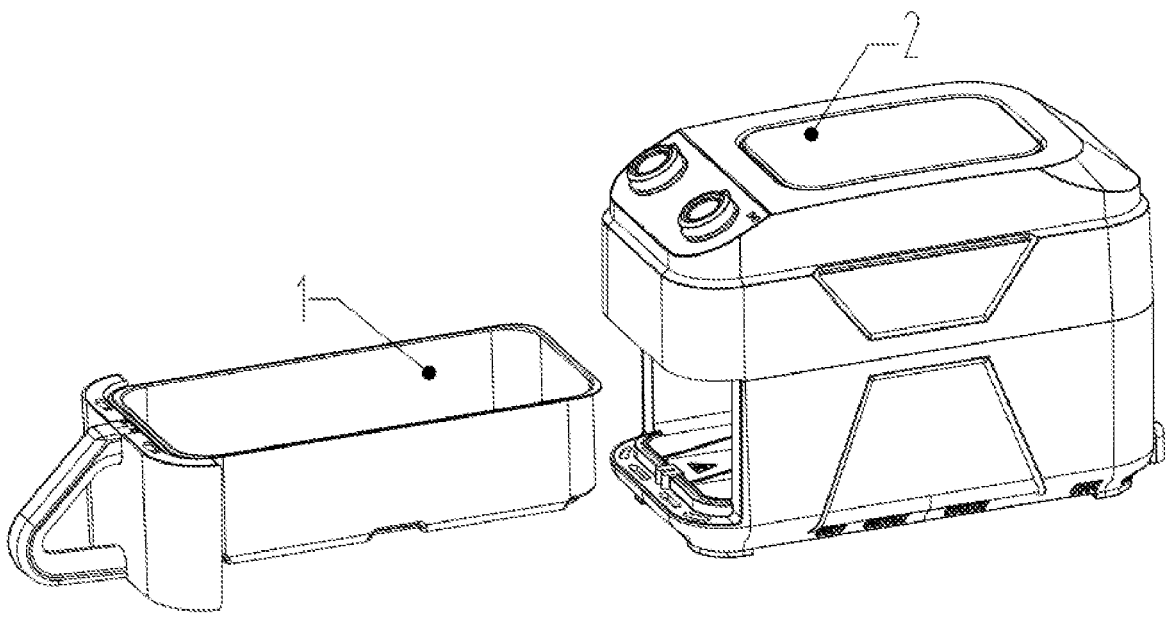
FIG. 5 is a component structure diagram of an air fryer in the present disclosure.

Specifically, as shown in FIGS. 3 to 4, the pot body 1 in the present disclosure includes a pot bottom and side walls surrounding the pot bottom, where the pot bottom and the side walls form an accommodating cavity, the accommodating cavity is of a rectangular structure, a length a of the accommodating cavity is less than or equal to 80 cm, a width b of the accommodating cavity is more than or equal to 10 cm, and a ratio k of the length a to the width b of the accommodating cavity is equal to 1.5-5.

Preferably, the ratio k of the length a to the width b of the accommodating cavity is equal to 2-2.5.

Preferably, the width b of the accommodating cavity is 10-50 cm.

The size of the above rectangular pot body is illustrated below by taking bread as an example. In general, a width of a piece of bread is 10-15 cm. If three pieces of breads with the maximum width of 15 cm are placed side by side, the total width thereof is 45 cm. However, a depth of a household kitchen cabinet is generally 55-80 cm. It may be seen from this that the length-width ratio k of the accommodating cavity is designed to be equal to 1.5-5, such that most of food may be accommodated. If the width is designed to be 45 cm, the length may be designed to be 68-80 cm. If the width is designed to be 15 cm, the length may be designed to be 23-75 cm. During actual design, the length and width of the pot body are reasonably set according to the food size, such that the pot body may meet normal demands of most users. After comprehensive consideration of cooking effect, user experience, etc., k=2-2.5 is most ideal; when the number of bread arranged side by side is taken as a reference, the value range of 10-50 cm of b is relatively ideal; and the pot body of this size may adapt to food that cannot be placed in most of circular pot bodies, for example, the food such as a whole fish, a kebab with a certain length, a whole chicken or duck, etc. may be placed in the pot body of this size, such that the integrity of the food is ensured, and the appearance and taste are better.

Specifically, as shown in FIG. 3, the side walls include a first side wall 11, a second side wall 12, a third side wall 13, and a fourth side wall 14 fixedly connected in sequence, the first side wall 11 and the third side wall 13 are arranged oppositely, the second side wall 12 and the fourth side wall 14 are arranged oppositely, an intersection between every two adjacent side walls is smoothly transitioned, and at least part of the first side wall 11 and at least part of the third side wall 13 have relatively parallel vertical surfaces. Compared with a full-curved-surface design, the accommodating cavity enclosed by the vertical surfaces has a larger size and is more suitable for the kitchen environment. Comprehensive use shows that the pot body with the rectangular structure in the present disclosure saves space by more than 40% compared with the circular pot body.

It should be noted that the first side wall 11 and the third side wall 13 are the side walls of the pot body in a length direction, and the second side wall 12 and the fourth side wall 14 are the side walls of the pot body in a width direction. In order to save space, at least part of the first side wall 11 and at least part of the third side wall 13 are vertical surfaces parallel to each other, and the second side wall 12 and the fourth side wall 14 are not limited and may be arc surfaces or vertical surfaces, or one is the arc surface and the other is the vertical surface. Thus, the shape of the pot body may be rectangular, quasi-elliptical, strip-shaped, etc.

Preferably, at least part of the second side wall 12 and/or at least part of the fourth side wall 14 are/is the vertical surfaces/the vertical surface. It may be known from experience that under the same capacity, the pot body with the side walls being the vertical surfaces saves space compared with the pot body with the side walls being the arc surfaces, or the pot body with the side walls being the vertical surfaces can better make full use of space to avoid unnecessary waste of available space. As a result, at least one of the second side wall 12 and the fourth side wall 14 in this embodiment contains the vertical surface. More preferably, the second side wall 12 and the fourth side wall 14 are the vertical surfaces.

Specifically, a handle 15 is fixed to an outer side surface of the second side wall 12, and the pot body 1 is pulled out or pushed into the whole air fryer through the handle 15.

As shown in FIGS. 5 to 14, the present disclosure further provides an air fryer, including a machine body 2 and the above pot body 1 arranged in the body. A flow guide isolation hood 3 is arranged in the machine body 2. After the pot body 1 is put into the machine body 2, the flow guide isolation hood 3 seals an opening in an upper end of the pot body 1 to form a heating cavity 4. The flow guide isolation hood 3 and the pot body 1 are of a rectangular structure, and the heating cavity 4 formed after the flow guide isolation hood 3 seals the pot body 1 is also of a similar rectangular structure. The rectangular structure referred to in the present disclosure is any regular shape with the length and width (such as a rectangular circular shape, an elliptical shape, a strip shape, etc.). The pot body is designed to be of the rectangular structure, such that it may accommodate food with a certain length such as a whole fish, a kebab with a certain length, strip-shaped bread, etc. to ensure the integrity of the food, and the overall size of the air fryer is better adapted to the kitchen environment.

Figure 6:
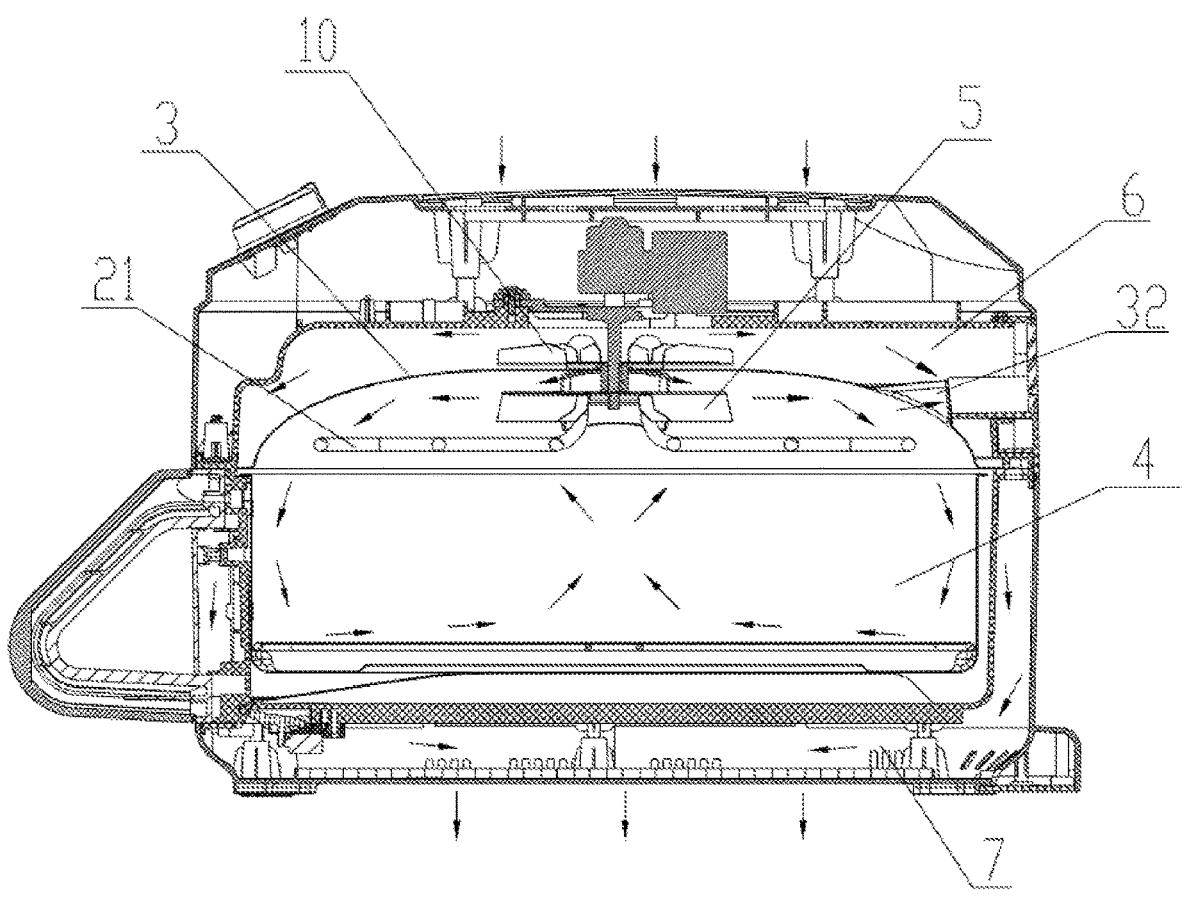
FIG. 6 is a cross-sectional view of the air fryer in the present disclosure.
Figure 11:
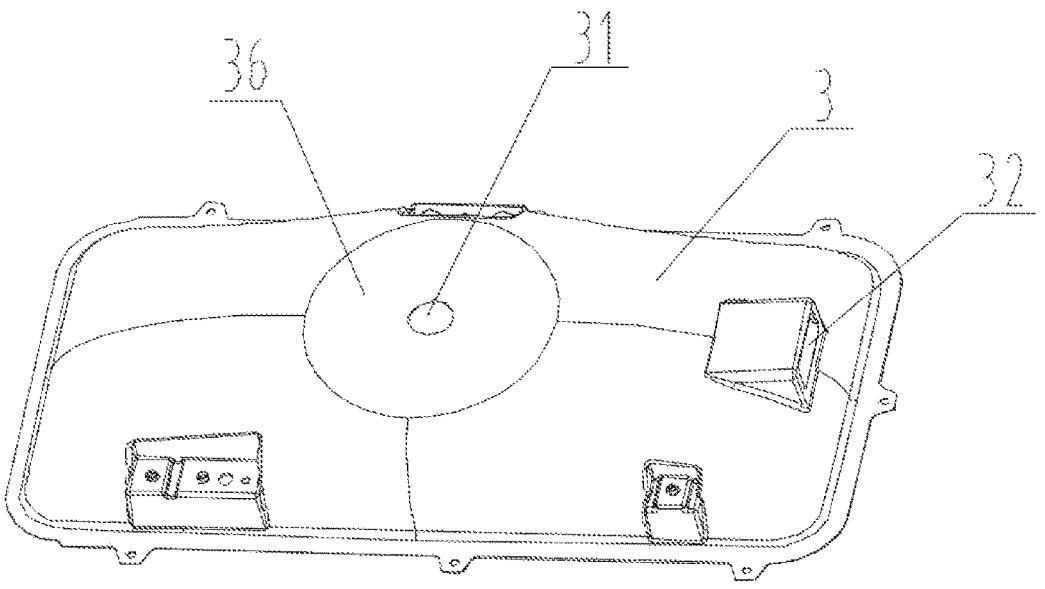
FIG. 11 is a structural diagram of an integral flow guide isolation hood of the air fryer in the present disclosure.
Figure 12:
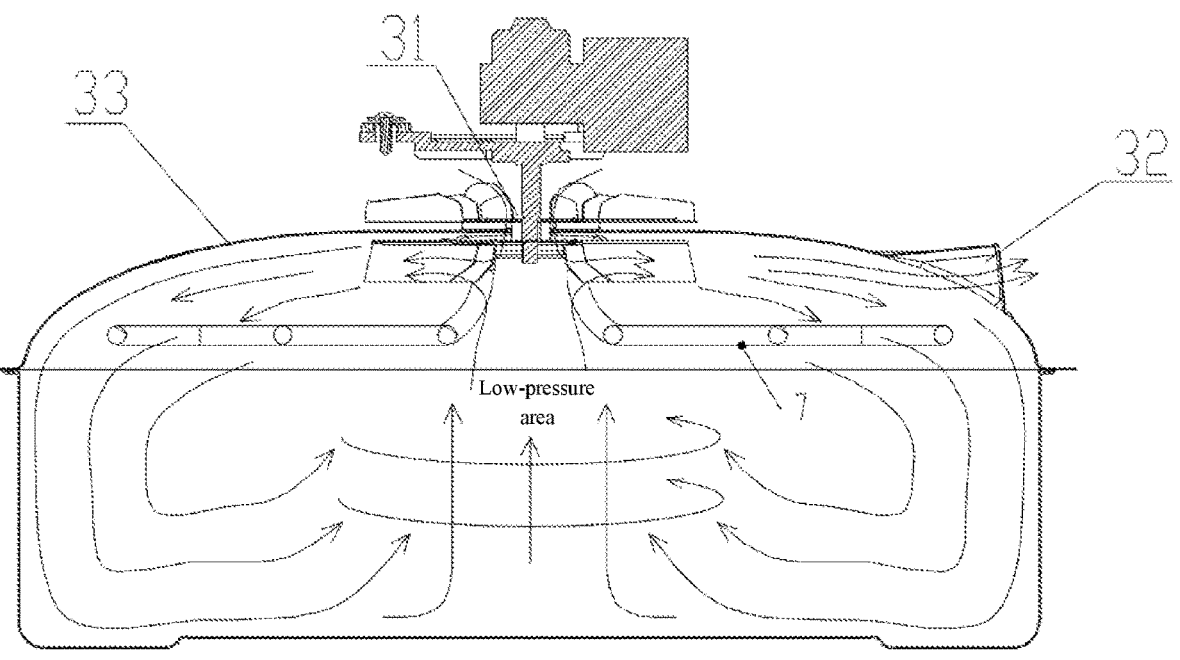
FIG. 12 is a guide diagram (one) of air flow in the heating cavity of the air fryer in the present disclosure.

As shown in FIGS. 6, 11, and 12, an air inlet 31 is formed in the middle of the flow guide isolation hood 3, a lower fan blade 5 is arranged below the air inlet 31, a flow guide curved surface 33 is formed on an inner side surface of the flow guide isolation hood 3 in a manner of surrounding the air inlet 31, and the flow guide curved surface 33 is configured to guide hot air generated by the lower fan blade 5 during operation to the periphery of the heating cavity 4 so as to realize uniform circulation of heat. In the present disclosure, an area enclosed by a plane where a lowest point of the lower fan blade 5 is located, a plane where a highest point of the lower fan blade is located, and the flow guide isolation hood 3 is defined as a flow guide cut-in area 34 (that is, an area enclosed by A'O'B' in FIG. 8). This area is mainly an area where air contacts the flow guide isolation hood 3 for the first time after being thrown out by a centrifugal force of the lower fan blade 5. The deceleration resistance of the flow guide cut-in area 34 to the air is larger than the deceleration resistances of other areas to the air, and the size of the flow guide cut-in area 34 directly affects the effect of air circulation in the heating cavity 4. In order to reduce the resistance of air circulation in the heating cavity 4, in the present disclosure, a point of intersection between a rotation axis of the lower fan blade 5 and a top surface of the flow guide isolation hood 3 is defined as B, any point on a lower edge of the inner side surface of the flow guide isolation hood 3 is taken as A, AB is a line segment on the inner side surface of the flow guide isolation hood 3, and an angle between a tangential direction of the point A on the line segment AB and a horizontal plane is defined as a derived angle $\alpha$. When $45° \leq \alpha \leq 90°$, the resistance to the air circulation is relatively small, and the closer to 90° the derived angle is, the better the circulation effect of air in the pot body 1 is.

Figure 8:
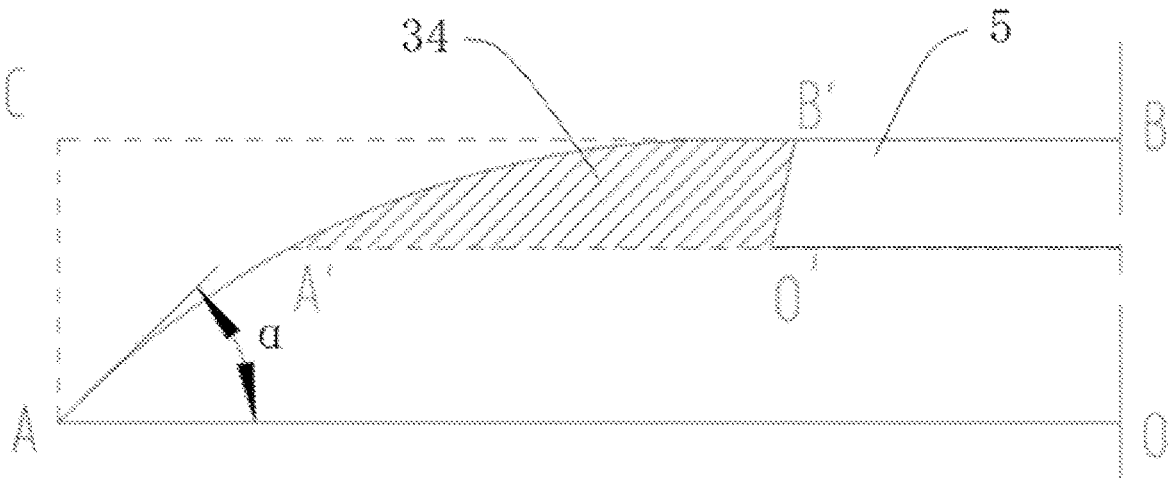
FIG. 8 is a sectional view (one) of a flow guide area of the air fryer in the present disclosure.

Specifically, a point of intersection between a horizontal plane passing through the point A and the rotation axis of the lower fan blade 5 is defined as O, and the flow guide isolation hood 3 is cut by taking a plane passing through three points AOB as a cross section to obtain a simplified surface AOBC as shown in FIG. 8, where a point C is a vertical point of intersection passing through the point A and the point B, a straight line BO is the rotation axis of the lower fan blade 5, an area enclosed by the three points ABO is a flow guide area, and the flow guide area comprises the above flow guide cut-in area A'O'B'.

Figure 9:
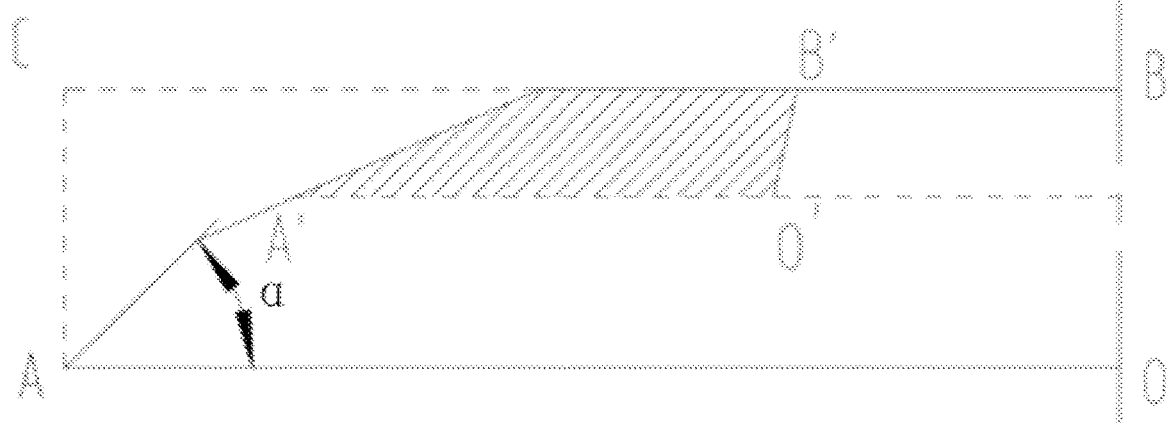
FIG. 9 is a sectional view (two) of the flow guide area of the air fryer in the present disclosure.
Figure 10:
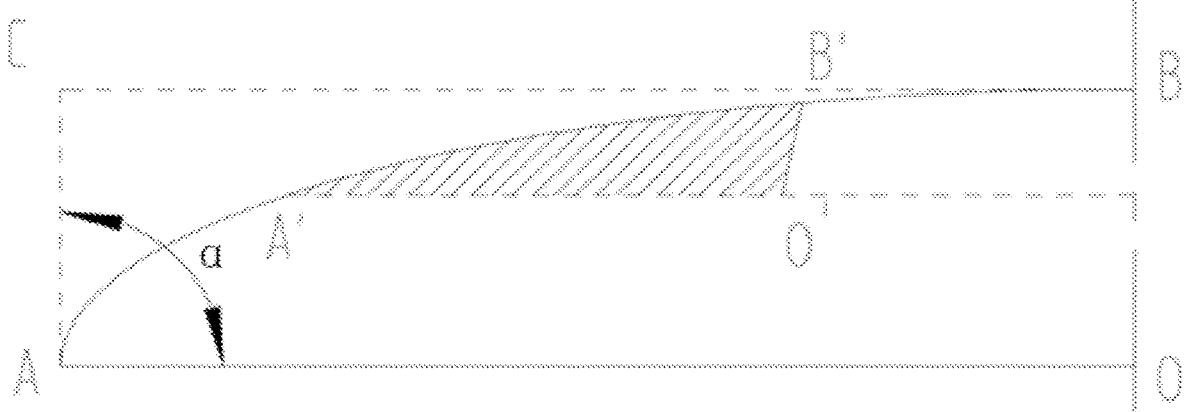
FIG. 10 is a sectional view (three) of the flow guide area of the air fryer in the present disclosure.

Optionally, the line segment AB on the inner side surface of the flow guide isolation hood 3 is a curve or a polyline. As shown in FIG. 9, the line segment AB comprises the polyline. As shown in FIGS. 8 and 10, the line segment AB comprises the curve. It is verified by calculation that the closer to the smooth curve the line segment AB is, the better the air circulation in the heating cavity 4 is.

Preferably, under the condition of the same cross section AOBC, fan size, etc., the smaller the area of the flow guide cut-in area A'O'B' is, the better the air circulation is.

More preferably, as shown in FIG. 10, under the condition that the size of the pot body, the size of a fan, and the rotational speed of the fan are constant, the line segment AB is selected as the curve, and the derived angle $\alpha$ is set to be 90°. When the area of the flow guide cut-in area A'O'B' and the area of the flow guide area AOB are minimal, the line segment AB is the best curve, and the curve AB is closer to an ellipse with AO and BO as semi-axes. In the best case, the area of the flow guide area AOB accounting for the cross section AOBC is 70-90%. When the area of the flow guide area AOB accounting for the cross section AOBC is 78-80%, the air circulation and the cooking effect are best.

Figure 7:
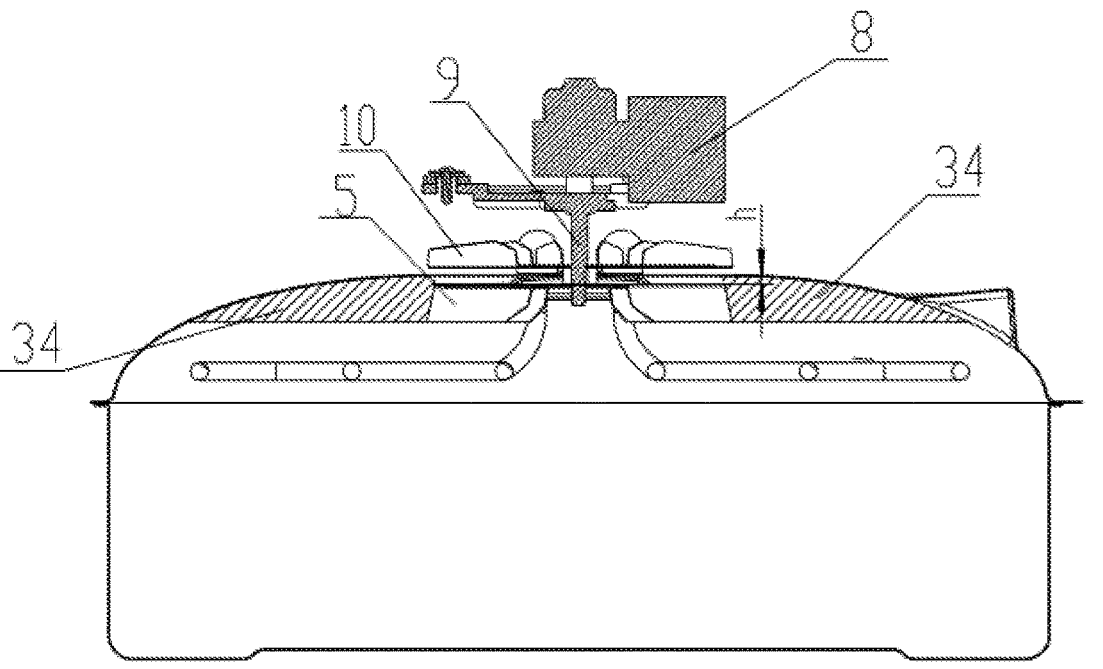
FIG. 7 is an enlarged structural diagram of a heating cavity of the air fryer in the present disclosure.

Preferably, as shown in FIG. 7, if the model and size of the lower fan blade 5 are kept constant, a distance between a plane where a highest point of the lower fan blade 5 is located and the top of the inner side surface of the flow guide isolation hood 3 is h. With the increase of h, the flow guide cut-in area 34 increases, and the air deceleration is enhanced. The longer h is, the more unfavorable for the circulation of hot air it is. When $0<h<30$, the air circulation is better. Preferably, after the verification of the heating effect, $0<h<10$, and when $0<h<10$, the thermal circulation of the air in the heating cavity 4 is best.

According to the present disclosure, as $45° \leq \alpha \leq 90°$ and $0<h<30$, the shape of the flow guide isolation hood and the position of the lower fan blade in the flow guide isolation hood are limited; and the above limitation is conducive to reducing the air circulation resistance, thereby making the hot air circulation in the heating cavity more uniform, and achieving the better cooking effect.

Specifically, as shown in FIG. 11, the flow guide isolation hood is an integral component, and the flow guide isolation hood 3 is of an inverted bowl-like structure; the inner side surface of the flow guide isolation hood 3 includes a horizontal plane area 36 positioned in the middle and the flow guide curved surface 33 positioned at the periphery of the horizontal plane area 36; the flow guide curved surface 33 gradually tilts down from inside to outside, such that the hot air is gradually guided to two ends of the heating cavity 4 in a length direction; the air inlet 31 is formed in the horizontal plane area 36; and a rotational area of the lower fan blade 5 is adapted to the horizontal plane area 36, which may be understood that the horizontal plane area 36 is a circular area with the same area as the rotational area of the lower fan blade 5. Meanwhile, an air outlet 32 is further formed in the flow guide isolation hood 3, the air outlet 32 communicates with the outside of the machine body 2, and the air outlet 32 is configured to discharge water of the food in the pot body 1.

Preferably, when the model and size of the lower fan blade 5 are fixed, the vertical distance between the plane where the highest point of the lower fan blade 5 is located and the horizontal plane area 36 is h. The longer h is, the more unfavorable for the circulation of the hot air it is. Preferably, $0<h<10$. When $0<h<10$, the thermal circulation of the air in the heating cavity 4 is better.

Figure 14:
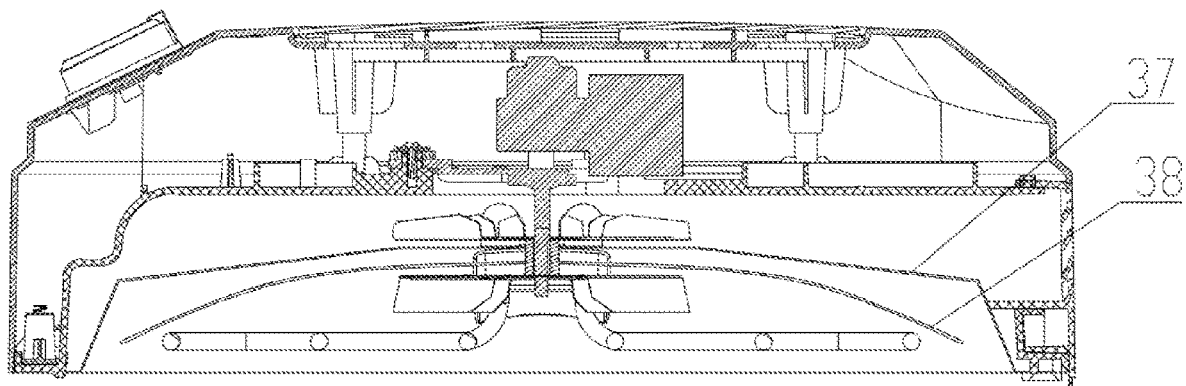
FIG. 14 is a structural diagram of a split flow guide isolation hood of the air fryer in the present disclosure.

It should be noted that the flow guide isolation hood 3 in the present disclosure has two effects, namely, an isolation hood effect and a flow guide effect. Based on the above two effects, the flow guide isolation hood 3 may also be designed to be of a split structure. As shown in FIG. 14, the flow guide isolation hood 3 may be divided into two parts, namely, an isolation hood 37 and a flow guide plate 38. The isolation hood 37 covers the opening in the upper end of the pot body 1 to form the closed heating cavity 4. The flow guide plate 38 is arranged below the isolation hood 37. The lower fan blade 5 is arranged below the flow guide plate 38. The flow guide plate 38 has a flow guide effect. The flow guide curved surface 33 is formed on an inner side surface of the flow guide plate 38. The flow guide cut-in area 34 is enclosed between the lowest and highest points of the lower fan blade 5 and the flow guide plate 38. The structure of the flow guide cut-in area may refer to the integral flow guide isolation hood, which will not be repeated.

Specifically, as shown in FIG. 6, a first heat dissipation cavity 6 and a second heat dissipation cavity 7 communicating with each other are formed in the machine body 2 of the air fryer in the present disclosure, the first heat dissipation cavity 6 is positioned above the heating cavity 4, the second heat dissipation cavity 7 is positioned below the heating cavity 4, a heating tube 21 is arranged in the heating cavity 4, the heating cavity 4 communicates with the first heat dissipation cavity 6 via the air inlet 31, and heat dissipation holes are formed in the bottom of the second heat dissipation cavity 7. A cold air inlet is formed in an upper portion of the first heat dissipation cavity 6. The first heat dissipation cavity 6 and the second heat dissipation cavity 7 communicate with each other to form a cold air circulation cavity. The heating tube 21 is arranged in the heating cavity 4 to form a hot air circulation cavity. The cold air circulation cavity wraps the hot air circulation cavity to dissipate heat and greatly reduce the temperature rise of the surfaces of the components and a machine inside the air fryer at the same time.

Specifically, as shown in FIG. 7, a motor 8 is arranged above the first heat dissipation cavity 6, a rotating shaft 9 of the motor 8 penetrates through the first heat dissipation cavity 6 and passes through the flow guide isolation hood 3 via the air inlet 31, an upper fan blade 10 and the lower fan blade 5 are coaxially installed on the rotating shaft 9, the upper fan blade 10 is positioned in the first heat dissipation cavity 6, the lower fan blade 5 is positioned in the heating cavity 4, the upper fan blade 10 is configured to circulate the air in the cold air circulation cavity, and the lower fan blade 5 is configured to circulate the air in the hot air circulation cavity.

Figure 13:
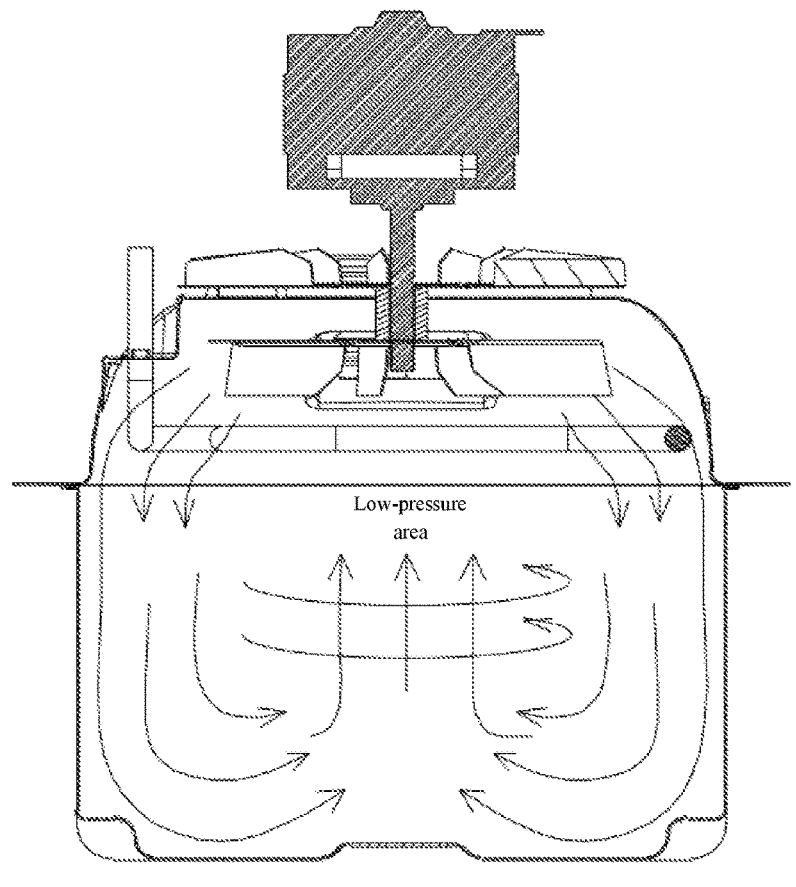
FIG. 13 is a guide diagram (two) of the air flow in the heating cavity of the air fryer in the present disclosure.

As shown in FIGS. 12 and 13, the present disclosure further provides an air circulation system, including hot air circulation and cold air circulation. Hot air generated by the lower fan blade 5 flows to the periphery of the hot air circulation cavity via the flow guide cut-in area 34, a low-pressure area is formed under the lower fan blade 5, the air dispersed to the periphery of the hot air circulation cavity is gathered from the bottom to the middle, the air spirally rises in the low-pressure area in the middle, and after rising to the lower fan blade 5, the air is thrown around to form high-speed circulation of the hot air; and the upper fan blade 10 rotates to blow cold air entering the first heat dissipation cavity 6 to the periphery, and the cold air flows to the second heat dissipation cavity 7 to form high-speed circulation of the cold air wrapping the heating cavity. Through the above air circulation system, the food in the pot body with the rectangular structure is uniformly cooked and is tender for inside and crisp for outside.

A working principle of the air circulation system in the present disclosure is as follows: the cold air circulates mainly in the first heat dissipation cavity 6 and the second heat dissipation cavity 7, the upper fan blade 10 controls the air flow circulation in the first heat dissipation cavity 6, the cold air enters the first heat dissipation cavity 6 from the cold air inlet in the top of an upper shell of the machine body 2 and is dispersed around and flows to the second heat dissipation cavity 7 under the action of the upper fan blade 10, and finally the cold air is discharged from the heat dissipation holes in the bottom of the second heat dissipation cavity 7. The cold air forms the cold air circulation wrapping the heating cavity in the first heat dissipation cavity 6 and the second heat dissipation cavity 7 to dissipate heat and greatly reduce the temperature of the surfaces of the components and the machine body inside the air fryer.

The hot air circulates in the heating cavity 4 and plays a role of cooking. During cooking, the lower fan blade 5 rotates to disperse the air entering from the air inlet 31 to the periphery by means of a centrifugal force. The hot air is guided to the periphery and the two ends of the heating cavity 4 in the length direction under the action of the flow guide curved surface 33. At this time, because the air is thrown away, the low pressure area will be formed under the lower fan blade 5. The air dispersed to the periphery and the two ends of the heating cavity in the length direction is gathered from the bottom to the middle, such that the air circulation as shown in FIGS. 6, 12, and 13 is formed inside the heating cavity. Under the action of the air circulation, the heat is uniformly dispersed to the whole pot body, and the water in the food is discharged from the air outlet at the same time, such that the high-speed circulation of the air in the air fryer is finally realized and the cooking effects of uniform cooking, tenderness for inside, and crispiness for outside are achieved.

The present disclosure has been further described above by means of specific embodiments, but it should be understood that the specific description herein should not be construed as a limitation to the spirit and scope of the present disclosure. Various modifications made to the above embodiments by those of ordinary skill in the art upon reading this specification fall within the scope of protection of the present disclosure.

The invention claimed is:

1. An air fryer, comprising a pot body, wherein the pot body comprising a pot bottom and side walls surrounding the pot bottom, the pot bottom and the side walls forming an accommodating cavity, the accommodating cavity being of a rectangular structure, a length a of the accommodating cavity being less than or equal to 80 cm, a width b of the accommodating cavity being more than or equal to 10 cm, and a ratio k of the length a to the width b of the accommodating cavity being equal to 1.5-5; wherein the air fryer further comprises a machine body and a flow guide isolation hood arranged in the machine body, and the flow guide isolation hood seals an opening in an upper end of the pot body to form a heating cavity after the pot body is put into the machine body; and an air inlet is formed in the middle of the flow guide isolation hood, a lower fan blade is arranged below the air inlet, a flow guide curved surface is formed on an inner side surface of the flow guide isolation hood in a manner of surrounding the air inlet, and the flow guide curved surface guides hot air in the heating cavity to the periphery of the heating cavity from the air inlet.

2. The air fryer according to claim 1, wherein a point of intersection between a rotation axis of the lower fan blade and a top surface of the flow guide isolation hood is B, any point on an edge of the inner side surface of the flow guide isolation hood is taken as A, AB is a line segment on the flow guide curved surface, an angle between a tangential direction of the point A on the line segment AB and a horizontal plane is defined as a derived angle $\alpha$, and $45°{\leq}\alpha{\leq}90°$.

3. The air fryer according to claim 2, wherein the line segment AB on the flow guide curved surface is a curve or a polyline.

4. The air fryer according to claim 1, wherein when the model and size of the lower fan blade are fixed, a distance h between a plane where a highest point of the lower fan blade is located and the top of the inner side surface of the flow guide isolation hood is more than 0 and less than 30.

5. The air fryer according to claim 4, wherein $0{<}h{<}10$.

6. The air fryer according to claim 1, wherein the inner side surface of the flow guide isolation hood comprises a horizontal plane area positioned in the middle and the flow guide curved surface positioned at the periphery of the horizontal plane area, the flow guide curved surface gradually tilts down from inside to outside, the air inlet is formed in the horizontal plane area, and a rotational area of the lower fan blade is adapted to the horizontal plane area.

7. The air fryer according to claim 1, wherein the flow guide isolation hood has an integral structure and is of an inverted bowl-like structure, and the flow guide curved surface is positioned on the inner side surface of the flow guide isolation hood and gradually tilts down from inside to outside.

8. The air fryer according to claim 1, wherein the flow guide isolation hood has a split structure and comprises an isolation hood for sealing the opening in the upper end of the pot body and a guide plate positioned below the isolation hood, the guide plate is of an inverted bowl-like structure, the lower fan blade is positioned below the guide plate, the flow guide curved surface is positioned on an inner side surface of the guide plate, and the flow guide curved surface gradually tilts down from inside to outside.

9. The air fryer according to claim 1, further comprising a first heat dissipation cavity and a second heat dissipation cavity formed in the machine body and communicating with each other, the first heat dissipation cavity being positioned above the heating cavity, the second heat dissipation cavity being positioned below the heating cavity, a heating tube being arranged in the heating cavity, the heating cavity communicating with the first heat dissipation cavity via the air inlet, and heat dissipation holes being formed in the bottom of the second heat dissipation cavity.

10. The air fryer according to claim 9, wherein a motor is arranged above the first heat dissipation cavity, a rotating shaft of the motor penetrates through the first heat dissipation cavity and passes through the flow guide isolation hood via the air inlet, an upper fan blade and the lower fan blade are coaxially installed on the rotating shaft, the upper fan blade is positioned in the first heat dissipation cavity, and the lower fan blade is positioned in the heating cavity.

11. The air fryer according to claim 10, wherein a cold air inlet is formed in an upper portion of the first heat dissipation cavity, the first heat dissipation cavity and the second heat dissipation cavity communicate with each other to form a cold air circulation cavity, the heating cavity forms a hot air circulation cavity, and the cold air circulation cavity wraps the hot air circulation cavity.

12. An air circulation system based on the air fryer according to claim 9, comprising hot air circulation and cold air circulation, wherein hot air generated by the lower fan blade flows to the periphery of the heating cavity via the flow guide curved surface while a low-pressure area is formed under the lower fan blade, the air dispersed to the periphery of the heating cavity is gathered from the bottom to the middle, the air spirally rises in the low-pressure area in the middle, and after rising to the lower fan blade, the air is thrown around to form the hot air circulation; and the upper fan blade rotates to blow cold air entering the first heat dissipation cavity to the periphery, and the cold air flows to the second heat dissipation cavity to form the cold air circulation wrapping the heating cavity.

\* \* \* \* \*